United States Patent [19]

Bollinger

[11] 4,034,571

[45] July 12, 1977

[54] DRINKING WATER SUPPLY SYSTEM

[76] Inventor: Donald D. Bollinger, 3116 Sharpview Lane, Dallas, Tex. 75228

[21] Appl. No.: 662,872

[22] Filed: Mar. 1, 1976

[51] Int. Cl.² .................. B60H 3/04; B67D 5/62
[52] U.S. Cl. .................................. 62/244; 62/389; 62/399; 222/146 C
[58] Field of Search ........... 62/244, 389, 396, 239, 62/399; 222/146 C

[56] References Cited

U.S. PATENT DOCUMENTS

| | | | |
|---|---|---|---|
| 2,466,676 | 4/1949 | Boling et al. | 62/399 |
| 2,653,014 | 9/1953 | Sniader | 222/146 C |
| 3,558,013 | 1/1971 | Ponzo et al. | 222/146 C |

*Primary Examiner*—Lloyd L. King
*Attorney, Agent, or Firm*—Richards, Harris & Medlock

[57] ABSTRACT

A drinking water supply system for use in vehicles equipped with air conditioning comprises a reservoir for receiving a quantity of potable water and a pump for supplying water from the reservoir. A conduit extends from the pump to a valve situated in the passenger compartment of the vehicle and adapted to regulate water flow from the pump. The conduit extending from the pump to the valve includes a wide, flat portion which is wrapped around a section of the conduit of the air conditioning system of the vehicle that is maintained in a low temperature condition during operation of the air conditioning system. In this manner the water flowing through the drinking water supply system is cooled by heat transfer to the refrigerant of the air conditioning system.

14 Claims, 5 Drawing Figures

DRINKING WATER SUPPLY SYSTEM

BACKGROUND AND SUMMARY OF THE INVENTION

This invention relates to a drinking water supply system, and more particularly to a system for dispensing cool drinking water in vehicles equipped with air conditioning.

As is well known, most vehicles presently being manufactured are equipped with air conditioning. Such vehicular air conditioning systems typically include a compressor driven directly by the engine of the vehicle and functioning to supply relatively high pressure, relatively high temperature refrigerant to a condenser. The condenser is often mounted in an overlying relationship with the radiator of the vehicle and functions to direct relatively high pressure, relatively low temperature refrigerant to an expansion valve. The expansion valve reduces the pressure of the refrigerant and simultaneously reduces the temperature thereof substantially further, whereupon low pressure, cold refrigerant is directed to an evaporator positioned within the passenger compartment of the vehicle. Apparatus is provided for effecting heat transfer from the air within the passenger compartment to the refrigerant passing through the evaporator, whereby the interior of the passenger compartment is cooled. The refrigerant leaving the evaporator is returned to the compressor of the air conditioning system, thus completing the cycle.

Those skilled in the art will appreciate the fact that the foregoing type of vehicular air conditioning system includes numerous conduit sections serving to interconnect the various component parts of the system. These conduit sections frequently include various metallic portions, such as couplings, unions and the like. A casual observation of the engine compartment of a vehicle equipped with such an air conditioning system will reveal the fact that these metallic portions of the conduit are often frost covered indicating a low temperature condition thereof during the operation of the air conditioning system. Additionally, the conduit sections may include metal sections such as at curves, bends and the like, and these metal sections are likewise often maintained in a low temperature condition during the operation of the system.

It is likewise well known that there is presently a marked trend toward the use of vehicles of all types for recreational purposes. For example, many families now utilize vacation time to make trips into remote and wilderness areas utilizing vehicles of various types including automobiles, trucks, trailers, motor homes, etc. During such trips it has been found to be very practical to carry along a supply of cool drinking water, thereby eliminating the necessity of frequent stops, particularly in those instances in which children are included among the passengers in the vehicle.

It will of course be recognized that various means presently exist whereby cool drinking water can be provided in vehicles of all types. For example, the conventional vacuum bottle may be used. However, as efficient as such devices have been proven to be, they are typically of limited capacity, and do not provide means for generating additional cool water once the original supply is exhausted. Similarly, the coventional metal or foam plastic ice chest or cooler may be utilized to maintain a supply of cool drinking water. Two difficulties which have been experienced in connection with the use of such devices involve the fact that they often occupy an undue amount of space within the vehicle and the fact that they are of little value in remote areas where it is difficult if not impossible to replenish the ice supply.

The present invention utilizes the cooling capacity of a vehicular air conditioning system to provide a supply of cool drinking water in vehicles intended for use in recreational pursuits, and otherwise. In accordance with the broader aspects of the invention there is provided a reservoir for receiving a supply of potable water and a pump for supplying water from the reservoir. A conduit extends from the pump to a valve located within the passenger compartment of the vehicle and adapted for selective operation to permit water flow therethrough. The pump may be operated under the control of an off/on switch and a pressure switch, and drain apparatus may be provided for conveying excess water out of the vehicle.

A portion of the conduit extending from the pump to the valve engages a section of the conduit of the vehicular air conditioning system that is maintained at low temperature during operation of the air conditioning system, thereby effecting heat transfer from the water to the refrigerant of the air conditioning system. For example, the conduit of the drinking water supply system may engage a metal fitting of the conduit of the air conditioning system, such as a coupling or union, or a metal bend section or elbow. Preferably the conduit of the drinking water supply system includes a relatively wide, flat portion which is wrapped around the portion of the conduit of the air conditioning system through which heat transfer will be effected. An insulating layer may be provided around the engaging portions of the drinking water conduit and the refrigerant conduit, thereby assuring heat transfer between the two fluids while preventing heat transfer to the surrounding atmosphere.

An important feature of the present invention involves the fact that whereas the drinking water conduit engages and effects heat transfer through the refrigerant conduit of the vehicular air conditioning system, there is no actual interconnection between the two systems. This is important in preventing any possibility of contamination of the drinking water by the refrigerant. Perhaps more importantly, by eliminating any direct interconnection with the air conditioning system, the present invention may be utilized in conjunction with virtually any type of vehicular air conditioning system, and yet does not encounter the possibility of negating the manufacturer's warranty on the air conditioning system.

DESCRIPTION OF THE DRAWINGS

A more complete understanding of the invention may be had by reference to the following Detailed Description when taken in conjunction with the accompanying Drawings, wherein.

DETAILED DESCRIPTION

Figure 1:
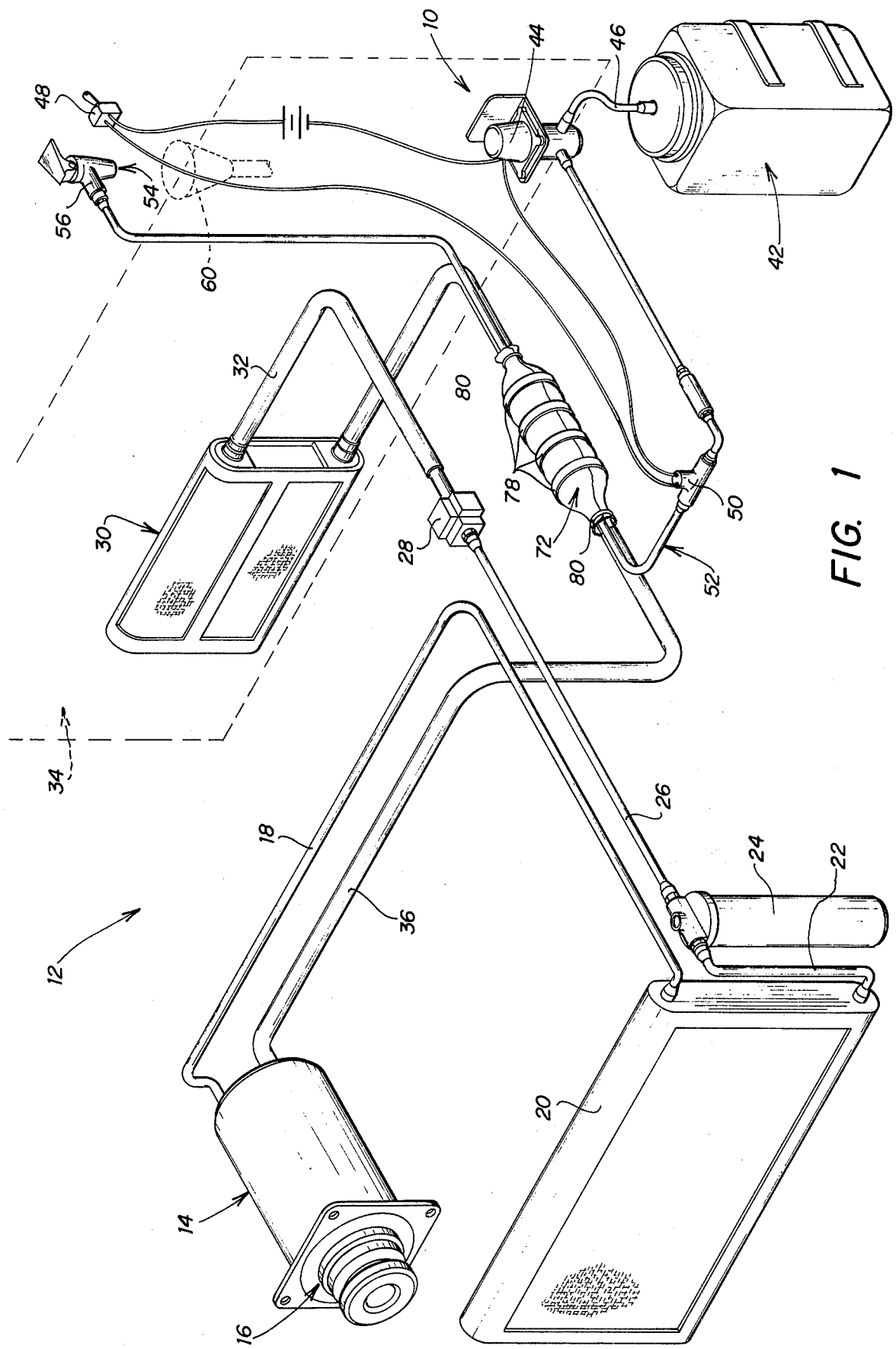
FIG. 1 is a perspective view illustrating a drinking water supply system incorporating the invention.

Referring now to the Drawings, and particularly to FIG. 1 thereof, there is shown a drinking water supply system 10 incorporating the invention. The drinking water supply system 10 is utilized in conjunction with a vehicular air conditioning system 12. The air conditioning system 12 includes a compressor 14 which is driven by the engine of the vehicle incorporating the system 12, typically by means of a pulley driven from the crankshaft of the engine. The compressor 14 includes a clutch apparatus 16, whereby the compressor 14 is selectively actuated in accordance with the operating conditions of the air conditioning system 12.

The compressor 14 functions to supply relatively high pressure, relatively high temperature refrigerant through a conduit 18. The conduit 18 extends to a condenser 20 which functions to substantially cool the refrigerant. The condenser 20 is typically mounted in an overlying relationship with the radiator of the vehicle incorporating the air conditioning system 12.

The condenser 20 supplies relatively high pressure, relatively low temperature refrigerant through a conduit 22. The refrigerant passes through a receiver 24 and a conduit 26 to an expansion valve 28. The expansion valve 28 functions to reduce the pressure and to substantially reduce the temperature of the refrigerant of the air conditioning system 12.

The relatively low pressure, very cold refrigerant flows from the expansion valve 28 to an evaporator 30 through an insulated conduit 32. As it flows through the evaporator 30, the temperature of the refrigerant is raised due to heat transfer to the surrounding atmosphere. Those skilled in the art will appreciate the fact that the components of the air conditioning system 12 other than the evaporator are typically positioned within the engine compartment of the vehicle incorporating the air conditioning system 12. The evaporator 30 is positioned on the opposite side of the fire wall 34 of the vehicle and is thus located within the passenger compartment thereof. Therefore, during the operation of the air conditioning system 12, the temperature of the air within the passenger compartment of the vehicle is substantially reduced by heat transfer to the chilled refrigerant flowing through the evaporator 30.

It will be further understood that the evaporator 30 may comprise part of the ventilating system of the vehicle. In such cases, fan or blower apparatus may be employed to direct air across or through the evaporator 30, thereby increasing the rate of heat transfer between the refrigerant of the air conditioning system 12 and the atmosphere within the passenger compartment of the vehicle. In any event, the operation of the evaporator 30 as well as the remainder of the air conditioning system 12 is not, in and of itself, part of the present invention.

The temperature of the refrigerant flowing through the conduit 36 is substantially above that of the refrigerant entering the evaporator 30 from the expansion valve 28. The refrigerant flowing through the conduit 36 may thus be characterized as in a relatively low pressure, relatively high temperature state. It will be understood, however, that the temperature of the refrigerant is nevertheless substantially below that of the ambient atmosphere, and particularly that of the atmosphere within the engine compartment of the vehicle incorporating the air conditioning system 12.

Figure 2:
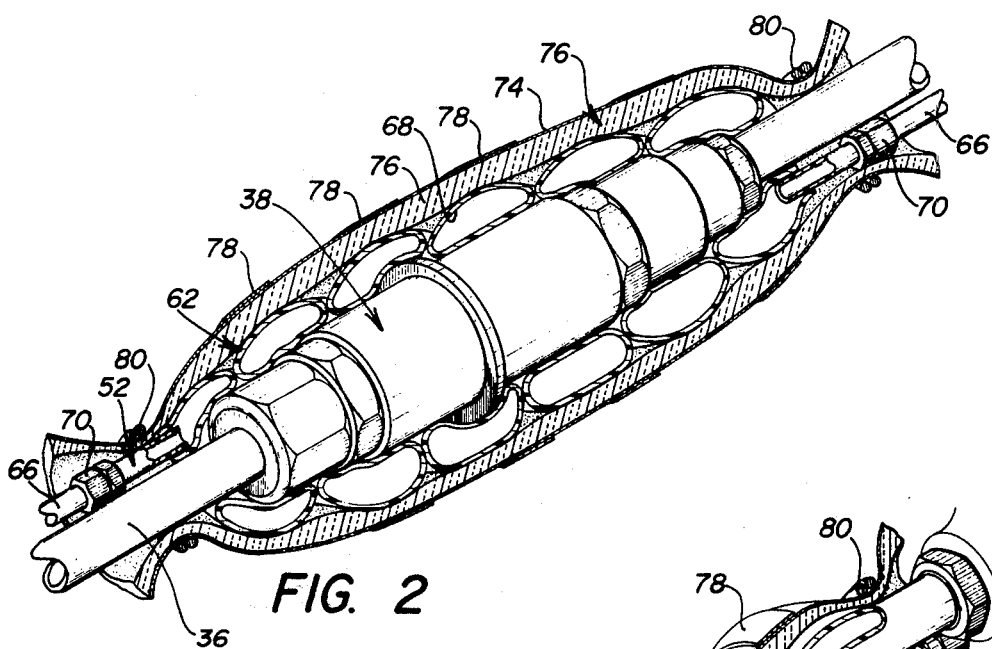
FIG. 2 is a sectional view illustrating a heat transfer construction which may be utilized in the practice of the invention.

Referring to FIG. 2, the conduit sections comprising the air conditioning system 12, and particularly the conduit sections 32 and 36 will typically include one or more metal fittings 38 which are maintained at a reduced or low temperature during the operation of the air conditioning system 12. These may comprise couplings, unions, and the like, and/or other fittings useful in the construction and/or maintenance of the air conditioning system. Such fittings are typically not covered by any sort of insulation layer, and are often characterized by the accumulation of a layer of frost thereon during the operation of the air conditioning system. The accumulation of such a frost layer on a particular metal fitting may be taken as an indication that the fitting is maintained at a reduced temperature during the operation of the air conditioning system 12.

Figure 3:
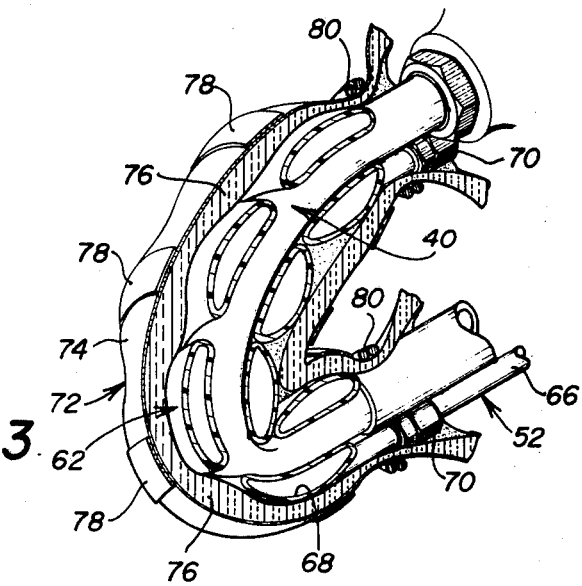
FIG. 3 is a sectional view illustrating an alternative heat transfer construction.

Referring to FIG. 3, the conduit sections 32 and 36 of the air conditioning system 12 may further include one or more metal tubing sections 40. These metal tubing sections may comprise elbows, bends, T-sections, right angle sections, and the like. Alternatively, such metal sections may simply comprise interconnections between lengths of elastomeric or plastic tubing. In any event certain of the metal sections 40 will be maintained at a reduced temperature during the operation of the air conditioning system 12 due to the passage therethrough of refrigerant having a temperature substantially below that of the surrounding atmosphere. Again, the fact that a particular tubing section is maintained at a reduced temperature during the operation of the air conditioning system 12 may be easily determined by observing the presence of a frost layer on the tubing section during the operation of the air conditioning system.

Referring again to FIG. 1, the drinking water supply system 10 includes a reservoir 42 for receiving a supply of potable water. The reservoir 42 may be situated at any convenient place on the vehicle, such as within the engine compartment. The reservoir 42 is preferably detachably mounted on the vehicle so as to facilitate both its sterilization and refilling thereof. Moreover, the reservoir 42 is preferably formed from a material adapted to receive boiling water directly therein. This is advantageous in remote areas in that water may be sterilized by boiling and then admitted directly to the reservoir 42 without encountering the danger that it will become recontaminated.

A pump 44 is connected to the bottom of the reservoir 42 by means of a conduit 46. The pump 44 functions to withdraw water from the reservoir 42 and to supply pressurized water. The pump 44 is preferably electrically operated, and is adapted for operation from the electrical system of the vehicle incorporating the air conditioning system 12 and the drinking water supply system 10 under the control of an off/on switch 48 and a pressure responsive switch 50. In such instances the off/on switch 48 is preferably situated within the passenger compartment of the vehicle.

A conduit 52 extends from the pump 44 to a discharge point 54 located within the passenger compartment of the vehicle. A manually operable valve 56 is provided at the discharge point 54 to control the flow of water from the pump 44 through the conduit 52. Thus, during operation of the drinking water supply system 10, drinking water is selectively obtainable within the passenger compartment of the vehicle by simply manipulating the valve 56. A drain assembly 60 may be provided under the discharge point 54 for use in conveying excess water out of the vehicle.

Referring simultaneously to FIGS. 1, 2 and 3, the conduit 52 extending from the pump 44 to the discharge point 54 includes a portion 62 which engages either one of the metal fittings 38 or one of the metal tubing sections 40 of the air conditioning system 12. The selection of the particular fitting 38 or tubing section 40 to be engaged by the portion 62 of the conduit 52 is arbitrary, and depends on the nature of the particular vehicular air conditioning system with which the drinking water supply system 10 is utilized. The only requirement in this regard is that the metal fitting 38 or the tubing section 40 which is selected for engagement by the portion 62 of the conduit 52 be one that is maintained at low temperature during the operation of the air conditioning system 12. Again, this determination may be easily made by simply observing an accumulation of frost on a particular fitting or tubing section during the operation of the air conditioning system.

The portion 62 of the conduit 52 which engages either the fitting 38 or the tubing section 40 of the air conditioning system 12 is preferably wrapped around the fitting or the tubing section in the manner illustrated in FIGS. 2 and 3. This is to promote heat transfer from the water flowing through the conduit 52 through the conduit portion 62 and through the fitting or tubing section to the refrigerant flowing in the air conditioning system. The manner in which the conduit portion 62 is wrapped around the fitting or tubing section is not critical, and may be adapted to suit particular circumstances. Moreover, in some instances it may not be necessary to wrap the conduit portion 62 around the fitting or tubing section, but merely to maintain close engagement therebetween.

Figure 4:
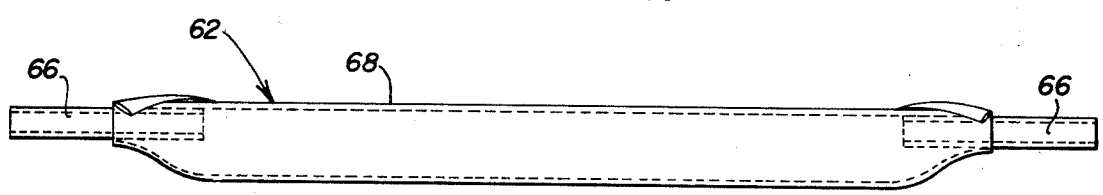
FIG. 4 is an illustration of the construction of the heat transfer portion of the water conduit of the drinking water supply system.

Referring to FIG. 4, the majority of the conduit 52 may comprise portions 66 which are circular in cross section and tubular in nature. The portion 62 which engages the fitting or tubular section of the air conditioning system that is maintained at reduced temperature during the operation thereof may comprise a wide, flat cross section. This is to facilitate the wrapping of the conduit portion 62 around the fitting or tubular section of the air conditioning system, thereby promoting maximum heat transfer between the water flowing through the conduit 52 and the refrigerant flowing through the air conditioning system. The various portions of the conduit 52 may be interconnected by means of commercially available fittings 70, whereby the assembly of the drinking water supply system 10 is facilitated. To this end, the tubular portion 66 of the conduit 62 may be supplied in a continuous length for cutting and securing to the wide, flat portion 68 following installation thereof.

Figure 5:
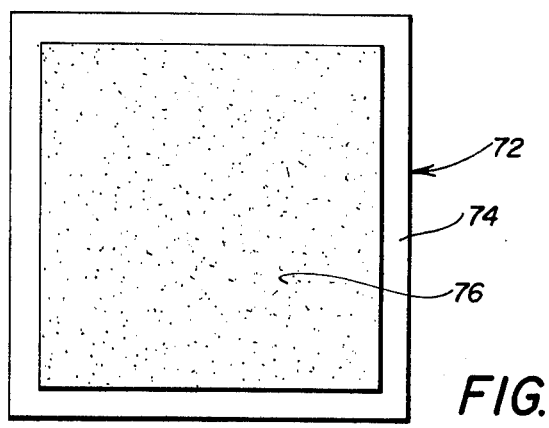
FIG. 5 is an illustration of the construction of an insulative covering which may be utilized in the practice of the invention.

Referring to FIGS. 1 and 5, an insulating layer 72 is preferably provided around the point of engagement of the conduit 52 and the air conditioning system 12. The insulating layer 72 may comprise a metal foil layer 74 having a layer of thermal insulating material such as fiberglass 76 mounted thereon. If this construction is employed, the layer 76 is mounted on the inside, and the layer 74 is mounted on the outside of the resulting assembly. Referring particularly to FIG. 1, the insulating layer 72 may be secured by means of conventional clamps 78 and wire ties 80.

The component parts of the drinking water supply system 10 may be fabricated from conventional materials. For example, the reservoir 42, the conduit 46 and the conduit 52 including all portions thereof may be fabricated from commercially available plastic materials which are preferably adapted for sterilization. For example, these components may be fabricated from polyethylene or various other commercially available plastic materials having the desired qualities. Those skilled in the art will appreciate the fact that the pump 44, the switches 48 and 50, and the valve 56 also comprise commercially available components.

The drinking water supply system 10 is easily installed on a vehicle. First, the reservoir 42 and the pump 44 are mounted at convenient locations such as within the engine compartment of the vehicle. The valve 56 is then mounted at a convenient location within the passenger compartment of the vehicle. Thereafter a conveniently located fitting or tubing section which is maintained at a low temperature during the operation of the air conditioning system of the vehicle is selected. As has been indicated, this is easily accomplished by simply operating the air conditioning system and observing accumulations of frost on various fittings and tubing sections thereof.

Following the selection of an appropriate fitting or tubing section, the portion 62 of the conduit 52 is wrapped therearound. The insulating layer 72 may then be installed and secured by means of the clamps 78 and ties 80. Thereafter, the conduit 46 is installed between the reservoir 42 and the pump 44, and the portions 66 of the conduit 52 are installed utilizing the fittings 70. At this point, or at any other convenient time during the installation procedure, the switches 48 and 50 may be installed, the former within the passenger compartment of the vehicle.

The reservoir 42 is next filled with potable water. If a supply of approved drinking water is available, no special precautions are necessary, such water being receivable directly in the reservoir 42. On the other hand, if the quality of the water is unknown, it may be sterilized such as by boiling prior to being received in the reservoir 42. The reservoir 42 is preferably adapted to receive boiling water directly therein.

In the operation of the drinking water supply system 10, drinking water may be received at the discharge point 54 at any time that the pump 44 is operating. The operation of the pump 44 may be either continuous or intermittent under the control of the switch 48. Assuming that the pump 44 is operating, drinking water is withdrawn from the reservoir 42 and is supplied through the conduit 52. Thus, it is simply necessary to manipulate the valve 56 in order to receive drinking water at the discharge point 54.

As the water flows from the reservoir to the conduit 52 under the action of the pump 44, it passes through the conduit portion 62. Assuming that the air conditioning system 10 is operating, the fitting 38 or the tubing section 40 thereof which is engaged with the conduit portion 62 will be maintained at a reduced temperature. The water flowing through the conduit 52 is therefore substantially cooled due to heat transfer through the conduit portion 62 and through the fitting or tubing sections engaged therewith. By this means a supply of cool drinking water is continuously available within the passenger compartment of the vehicle, notwithstanding the ambient temperature or the temperature within the engine compartment of the vehicle.

From the foregoing it will be understood that the present invention comprises a drinking water supply system particularly adapted for use in vehicles equipped with air conditioning which incorporates numerous advantages over the prior art. Perhaps the most important advantage involves the fact that by means of the invention, cool drinking water is continuously available to persons within the passenger compartment of the vehicle, notwithstanding the fact that the vehicle is operating in a remote location which may be substantially removed from any source of ice, etc. Another advantage involves the fact that whereas the invention utilizes the air conditioning system of the vehicle to cool the drinking water as it is discharged, the drinking water supply system of the present invention does not interfere with the operation of the air conditioning system of the vehicle in any way whatsoever. In fact, a clear line of demarcation is maintained between the two systems in order to (a) eliminate any possibility that the manufacturer's warranty on the air conditioning system will be voided by the use of the drinking water supply system as might occur if a physical connection to the air conditioning system were to be made, and (b) prevent any possibility of the contamination of the drinking water supplied from the drinking water supply system due to the presence of the refrigerant from the air conditioning system therein. Another advantage to the use of the invention involves the fact that drinking water supply systems constructed in accordance therewith may be fabricated from a relatively small number of either commercially available or easily fabricated parts, whereby the invention is economical both in manufacture and in use. Still another advantage involves the fact that the component parts thereof are adapted for sterilization and the fact that the reservoir thereof is adapted to receive boiling water whereby water may be received in the system from nonapproved sources without danger to subsequent users thereof. Other advantages deriving from the use of the invention will readily suggest themselves to those skilled in the art.

Although preferred embodiments of the invention have been illustrated in the accompanying Drawings and described in the foregoing Detailed Description, it will be understood that the invention is not limited to the embodiments disclosed, but is capable of numerous rearrangements, modifications and substitutions of parts and elements without departing from the spirit of the invention.

What is claimed is:

1. A vehicular drinking water supply system comprising in combination:
    a vehicular air conditioning system including:
        compressor means for supplying relatively high temperature, relatively high pressure working fluid;
        condenser means for receiving refrigerant from the compressor means and for supplying relatively high pressure, relatively low temperature refrigerant;
        expansion valve means for receiving refrigerant from the condenser means and for supplying relatively low pressure, extremely low temperature refrigerant;
        evaporator means for receiving refrigerant from the expansion valve means and for returning relatively low pressure, relatively high temperature refrigerant to the compressor means; and
        conduit means interconnecting the compressor means, the condenser means, the expansion valve means and the evaporator means;
        the conduit means of the air conditioning system including at least one conduit section which is maintained at a reduced temperature during the operation of the system;
        said conduit section which is maintained at reduced temperature comprising an unaltered component part of the vehicular air conditioning system;
    reservoir means for receiving a quantity of potable water and for maintaining said water at ambient temperature;
    potable water conduit means extending from the reservoir to a discharge point located within the passenger compartment of the vehicle; and
    valve means for controlling the flow of water through the potable water conduit means;
    a portion of the potable water conduit extending from the reservoir to the discharge outlet engaging the conduit section of the air conditioning system which is maintained at a reduced temperature during the operation thereof, whereby the water flowing through the potable water conduit from the reservoir to the discharge outlet is cooled by heat transfer to the refrigerant flowing through the conduit section of the air conditioning system;
    the point of engagement of the air conditioning conduit section and the potable water conduit being substantially displaced from the reservoir means.

2. The drinking water supply system according to claim 1 further characterized by a pump for receiving water from the reservoir and for discharing the water through the potable water conduit to the discharge point.

3. The drinking water supply system according to claim 2 further characterized by pressure switch means and off/on switch means for regulating the operation of the pump.

4. The drinking water supply system according to claim 1 wherein the potable water conduit includes a wide, flat portion which is wrapped spirally around the section of the conduit of the air conditioning system which is maintained at reduced temperature during the operation of the air conditioning system so that the air conditioning conduit section extends axially through the spirally wound portion of the wide, flat portion of the potable water conduit.

5. The drinking water supply system according to claim 1 further including an insulating layer enclosing the conduit section of the air conditioning system and the portion of the potable water conduit wrapped therearound for promoting heat transfer between the water and the refrigerant while restricting heat transfer between the refrigerant and the surrounding atmosphere.

6. In combination with a vehicular air conditioning system of the type including a compressor for supplying relatively high temperature, relatively high pressure refrigerant, a condenser for receiving refrigerant from the compressor and for supplying relatively high pressure, relatively low temperature refrigerant, an expansion valve for receiving refrigerant from the condenser and for supplying relatively low pressure, substantially low temperature refrigerant, an evaporator for receiving refrigerant from the expansion valve and for returning relatively low pressure, relatively high temperature to the refrigerant to the compressor, and conduit means interconnecting the compressor, the condenser, the expansion valve and the evaporator for conveying refrigerant therebetween, the conduit means including at least one conduit section which is maintained at a reduced temperature during the operation of the air conditioning system, said conduit section which is maintained at reduced temperature comprising an unaltered component part of the vehicular air conditioning system, a system for supplying drinking water in the vehicle incorporating the air conditioning system which comprises:

reservoir means for receiving a quantity of potable water and for maintaining said water at ambient temperature;

potable water conduit means for conveying water from the reservoir means to a discharge point within the passenger compartment of the vehicle; and valve means for controlling the flow of water from the reservoir through the potable water conduit to the discharge point;

a portion of the potable water conduit engaging the section of a refrigerant conduit which is maintained at reduced temperature during the operation of the air conditioning system so that water is cooled by heat transfer through the potable water conduit and the conduit section to the refrigerant flowing through the air conditioning system;

the point of engagement of the air conditioning conduit section and the potable water conduit being substantially displaced from the reservoir means.

7. The drinking water supply system according to claim 6 further characterized by pump means for effecting water flow from the reservoir through the potable water conduit to the discharge point.

8. The drinking water supply system according to claim 7 further characterized by pressure switch means and off/on switch means for regulating the operation of the pump means.

9. The drinking water supply system according to claim 6 wherein the potable water conduit includes a portion which is spirally wrapped around the section of the conduit of the air conditioning system which is maintained at reduced temperature during the operation of the air conditioning system so that the air conditioning conduit section extends axially through the spirally wound portion of the potable water conduit.

10. The drinking water supply system according to claim 9 wherein the portion of the potable water conduit which is wrapped around the section of the air conditioning system conduit has a wide, flat cross section.

11. The drinking water supply system according to claim 6 further including an insulating layer enclosing the conduit section of the air conditioning system and the portion of the potable water conduit wrapped therearound for promoting heat transfer between the water and the refrigerant while restricting heat transfer between the refrigerant and the surrounding atmosphere.

12. The drinking water supply system according to claim 6 wherein the reservoir means and the potable water conduit means for conveying the water from the reservoir means to the discharge point are formed from sterilizable plastic materials.

13. The drinking water supply system according to claim 12 wherein the reservoir means is adapted to receive boiling water directly therein.

14. The drinking water supply system according to claim 13 wherein the reservoir means comprises a container detachably mounted on the vehicle to facilitate refilling thereof.

* * * * *